(12) United States Patent
Ng

(10) Patent No.: US 6,355,769 B1
(45) Date of Patent: Mar. 12, 2002

(54) PARTIALLY AROMATIC POLYAMIDES AND A PROCESS FOR MAKING THEM

(75) Inventor: Howard Ng, Kingston (CA)

(73) Assignee: DuPont Canada, Inc., Mississauga (CA)

( * ) Notice: Subject to any disclaimer, the term of this patent is extended or adjusted under 35 U.S.C. 154(b) by 0 days.

(21) Appl. No.: 09/509,860

(22) PCT Filed: Sep. 24, 1998

(86) PCT No.: PCT/CA98/00907

§ 371 Date: Jun. 21, 2000

§ 102(e) Date: Jun. 21, 2000

(87) PCT Pub. No.: WO99/18144

PCT Pub. Date: Apr. 15, 1999

Related U.S. Application Data
(60) Provisional application No. 60/060,770, filed on Oct. 2, 1997.

(51) Int. Cl.[7] .......................... C08G 69/26; C08G 69/30
(52) U.S. Cl. ................. 528/310; 528/170; 528/324; 528/329.1; 528/330; 528/332; 528/335; 528/336; 528/338; 528/339; 528/347; 528/349
(58) Field of Search ................. 528/349, 310, 528/170, 324, 329.1, 335, 332, 336, 338, 339, 347

(56) References Cited

U.S. PATENT DOCUMENTS

| | | | |
|---|---|---|---|
| 3,692,749 A | 9/1972 | Schmitt et al. ............... | 260/78 |
| 3,932,362 A | 1/1976 | Schneider et al. ........ | 260/78 S |
| 5,502,155 A | 3/1996 | Ng .............................. | 528/349 |

FOREIGN PATENT DOCUMENTS

EP   0 574 297 A1   12/1993   ........... C08G/69/26

OTHER PUBLICATIONS

Derwent Database WPI, Document No. XP–002086410, Abstract of JP 57 070125 A (Unitika Ltd.), Apr. 30, 1982.

Derwent Database WPI, Document No. XP–002086411, Abstract of JP 63 092775 A (Asahi Chem Ind Co Ltd), Apr. 23, 1988.

*Primary Examiner*—P. Hampton-Hightower

(57) ABSTRACT

A process for making partially aromatic polyamides is provided in which an aromatic dicarboxylic acid component, at least 20–100% by weight of the dicarboxylic acid in the acid component is in the form of an alkylated ester, and a diamine component, comprising a diamine having from 6–12 carbon atoms, are admixed in the presence of water and with heating to form polyamide having from 1–100% on a molar basis of N-alkylated amide and amine groups. The polyamides are particularly useful in the manufacture of products intended for use at elevated temperatures or products in which retention of properties at elevated temperatures is required, including articles using injection molding technology, parts for automotive end-uses and electronics. The polyamides can also be formed into films and fibers for use in associated products.

26 Claims, No Drawings

PARTIALLY AROMATIC POLYAMIDES AND A PROCESS FOR MAKING THEM

This application is a 371 of PCT/CA98/00907 filed Sep. 24, 1998; which claims benefit to Provisional Application 60/060,770 filed Oct. 2, 1997.

FIELD OF THE INVENTION

The present invention relates to the manufacture of partially aromatic polyamides. In particular, the present invention relates to a process for making a partially aromatic polyamide from an aliphatic diamine and the dialkyl ester of an aromatic dicarboxylic acid.

BACKGROUND OF THE INVENTION

Partially aromatic polyamides consist of aromatic dicarboxylic acid and aliphatic diamine monomer units. Such polyamides are generally characterized by high melting points, high glass transition temperatures, low moisture absorption and, unlike aliphatic polyamides such as nylon 6 and nylon 66, good dimensional stability under moist conditions. The combination of high temperature and dimensional stability render partially aromatic polyamides particularly suitable for use in electronics, engineering plastics, films and fibres.

Unfortunately, however, the majority of partially aromatic polyamides are difficult to manufacture using the conventional melt polycondensation process that is successfully used in the manufacture of aliphatic polyamides. These processes generally involve admixing a dicarboxylic acid and a diamine to form a salt in aqueous solution. The salt is heated to a temperature that is higher than the melting point of the polyamide being formed but that does not result in excessive thermal degradation of the desired polyamide. U.S. Pat. No. 5,502,155 to Ng, issued Mar. 26, 1996, does, however, describe such a process for making partially aromatic polyamides. The process involves heating an admixture of an aromatic dicarboxylic acid and an aliphatic diamine to a temperature of at least 270° C. at a pressure of at least 1.2 MPa in the presence of a monocarboxylic acid such as formic acid. Water is added incrementally during heating. This process is particularly suitable for making polyamides from 2,6 naphthalene dicarboxylic acid, and cannot be universally applied to all partially aromatic polyamides.

Partially aromatic polyamides are characterized by melting points of at least about 275° C. and in some instances, melting points of greater than 300° C. Such high melting points generally result in significant thermal degradation during the synthesis of the desired polyamide. Moreover, branching formation side reactions compete with the polymerization reaction at the high temperatures required to maintain the partially aromatic polyamide in the form of a melt. These side reactions lead to serious melt viscosity build-up as the molecular weight of the polyamide increases. The viscous melt traps gaseous condensate within the polymeric molecule. This causes voids to form in the polymer which make subsequent processing of the polyamide difficult.

Processes have been developed which resolve some problems associated with making partially aromatic polyamides by conventional means. For example. Wittbecker and Morgan (Journal of Polymer Science, 40:280 (1959)) describe an interfacial polycondensation process in which an acid chloride, such as a dicarboxylic acid chloride, is reacted with a compound containing an active hydrogen atom (—OH, —NH and —SH) near the interface of the two phases of a heterogeneous liquid system, for example benzene in water. Yamazaki et al. (Journal of Polymer Science, 13:1373–1380 (1975)) describe a low-temperature method of reacting the phosphite and phosphonate salts of aromatic diamines and aliphatic dicarboxylic acids in a pyridine solution in the presence of metal salts such as LiCl or $CaCl_2$. However, both of these methods are too costly for practical use on a commercial scale, and nevertheless, would be difficult to conform to continuous operations.

U.S. Pat. No. 3,642,710 to Keen, which issued Feb. 15, 1972, describes a process for making high molecular weight polyamides such as polydodecamethylene terephthalamide, which is a partially aromatic polyamide, at a decreased temperature. Specifically, the reactant, dodecamethylene diammonium terephthalate, is heated at a temperature of about 255–275° C., in the presence of a viscosity stabilizer, a reagent capable of controlling the molecular weight of the polyamide when the polymerization reaction attains equilibrium. In this process, the reaction mass remains solid and can subsequently be melt spun into filaments.

U.S. Pat. No. 3,917,561 to Chapman and Pickett, which issued Nov. 4, 1975, teaches another process for making polydodecamethylene terephthalamide in which a cation-exchange treated dodecamethylene diammonium terephthalate salt is melt polymerized in the presence of a sterically hindered phenol, benzenephosphinic acid, copper acetate in combination with an alkali metal halide or a mixture of any of these additives. In this process, the additives cooperate with the cation-exchange treated salt to provide a melt-stable polyamide. Both this method and the method of Keen described above undesirably involve the step of forming a salt from the diacid and diamine reactants and the use of special additives such as stabilizers. The Chapman and Pickett method further requires the costly step of salt purification by ion-exchange.

Processes for making high molecular weight polyamides at lower temperatures have also been developed. In this regard U.S. Pat. No. 4,131,712 to Sprauer, which issued Dec. 26, 1978, describes a process in which a dicarboxylic acid-rich (diacid-rich) component and a diamine-rich component are combined with heating in the absence of water to form a polyamide. The diacid- and diamine-rich components each have melting points which are depressed in comparison to the pure diacid and diamine compounds, advantageously allowing the polymerization to be conducted at a lower temperature, and thereby minimizing thermal degradation. Such a process cannot be used in the manufacture of partially aromatic polyamides for a number of reasons. At the outset, the aromatic dicarboxylic acid reactants used to synthesize partially aromatic polyamides have an extremely high melting point and often cannot be melted without themselves being thermally degraded. Further, these reactant mixtures are not stable under anhydrous conditions, conditions which are central to the Sprauer process.

SUMMARY OF THE INVENTION

It has now been found that partially aromatic polyamides can be manufactured by combining an aromatic dicarboxylic acid component, at least a portion of which is in the form of an alkylated ester, with a diamine component in the presence of water. Esterification of the dicarboxylic acid advantageously lowers its melting point to a temperature that allows melting of the acid while avoiding, or at least minimizing, thermal degradation thereof. Admixture of the dicarboxylic acid component and the diamine component in the form of a melt is thereby facilitated. Further, the partially aromatic polyamide formed by these reactants likewise contains the alkyl sidechains and these sidechains function also to depress the melting point of the polyamide, yielding a polyamide that is more readily processed than the corresponding polyamide that lacks such alkyl sidechains.

Accordingly, the present invention provides a process for making a partially aromatic polyamide from at least one aromatic dicarboxylic acid component and at least one aliphatic diamine component comprising a diamine having from 6–12 carbon atoms, wherein 20–100% by weight of the dicarboxylic acid in said acid component is in the form of an alkylated ester, said process comprising the steps of:

(a) admixing non-stoichiometric amounts of the acid component with the diamine component in the presence of water;

(b) heating the admixture to a temperature at which it forms a melt while discharging therefrom volatile matter;

(c) further heating the admixture to a temperature above the melting point of the partially aromatic polyamide to form a polyamide oligomer;

(d) adding sufficient amounts of an aliphatic diamine having from 6–12 carbon atoms, or an aromatic dicarboxylic acid, at least a portion of which is in the form of an alkylated ester, so that the total amounts of the acid component and diamine component in the admixture of step (c) are approximately stoiciometric;

(e) heating the admixture of step (d) to a temperature at which it forms a melt while discharging therefrom volatile matter; and (f) further heating the admixture to a temperature above the melting point of the stoichiometrically-balanced partially aromatic polyamide to form the polyamide.

In a further aspect of the present invention, there is provided a partially aromatic polyamide formed from at least one aromatic dicarboxylic acid component and at least one aliphatic diamine component, wherein 20–100% by weight of the dicarboxylic acid of said acid component is in the form of an alkylated ester and said diamine component comprises a diamine having from 6–12 carbon atoms, said polyamide comprising from 1–100% on a molar basis of N-alkylated amide and amine groups.

DETAILED DESCRIPTION OF THE INVENTION

A novel process for making partially aromatic polyamides is provided in which an aromatic dicarboxylic acid component, at least a portion of which comprises an alkylated ester of the aromatic dicarboxylic acid, is combined with a diamine component comprising a diamine having from 6–12 carbon atoms.

The aromatic dicarboxylic acid component suitable for use in the present process may be selected from the group comprising an aromatic dicarboxylic acid, at least a portion of which is in the form of an alkylated ester; and a dicarboxylic acid oligomer comprising a non-stoichiometric amount of an aromatic dicarboxylic acid, at least a portion of which is in the form of an alkylated ester, and an aliphatic diamine having from 6–12 carbon atoms in which the balance of the acid oligomer comprises the dicarboxylic acid.

Suitable aromatic dicarboxylic acids for use as the dicarboxylic acid component in the present process include terephthalic acid, isophthalic acid and naphthalene dicarboxylic acids. Mixtures of these acids can also be used. In accordance with the present invention, at least a portion of the dicarboxylic acid must be in the form of an alkylated ester. In this regard, preferably at least 20% by weight of the acid is in the form of an alkylated ester. More preferably, at least 40–75% by weight of the acid is in the form of an alkylated ester, and most preferably, essentially 100% by weight of the acid is in the form of an alkylated ester.

Alkylation of the dicarboxylic acid to form an alkylated ester is carried out using processes well-known in the art, for example, the esterification of an acid by an alcohol as described in "Advanced Organic Chemistry Reactions, Mechanisms and Structures (J. March. McGraw Hill, 1968, p.320). The dicarboxylic acid may be alkylated with groups containing from 1–4 carbon atoms. Preferably, the dicarboxylic acid is alkylated with groups containing 1–2 carbon atoms, i.e. methyl and ethyl groups. A particularly preferred alkylated ester in accordance with the present invention is a dialkylated ester of a dicarboxylic acid.

Use of the aromatic dicarboxylic acid, either partially or wholly in the form of an alkylated ester, in the present process provides a number of advantages not realized in prior art processes for making partially aromatic polyamides. At the outset, the melting point of the alkylated ester form of aromatic dicarboxylic acids is substantially lower than the melting point of the dicarboxylic acid itself. The profound differences in melting point between an aromatic dicarboxylic acid and its alkylated ester can be illustrated by terephthalic acid and its dialkylated ester, dimethyl terephthalate. The melting point of terephthalic acid is greater than 400° C., while the melting point of dimethyl terephthalate is about 140° C. In some cases, the melting points of aromatic dicarboxylic acids are so high that the acid is thermally degraded before the melting point is attained. Thus, the presence of the acid in alklyated ester form functions advantageously to depress the overall melting point of the acid. Depression of the dicarboxylic acid melting point is beneficial because it decreases the amount of time that the reactants are exposed to elevated temperatures, for example temperatures exceeding the melting point of the desired partially aromatic polyamides which typically range from 260°–320° C., the temperature at which the final step in the present process is conducted. This decrease in the use of elevated temperatures is significant in minimizing thermal degradation of reactants and product during the process. It also plays a significant role in minimizing branching formation side reactions which result in the formation of voids in the polyamide that make subsequent processing of the polyamide difficult. A further advantage of using the alkylated ester of dicarboxylic acids in the process of making the partially aromatic polyamides is that the aliphatic diamine reactants have good solubility in molten aromatic alkylated ester.

Oligomers suitable for use as the dicarboxylic acid component of the present process are formed from a suitable aromatic dicarboxylic acid as set out above, at least a portion of which is in the form of an alkylated ester, and an aliphatic diamine, either linear or branched, having from 6–12 carbon atoms. In this regard, suitable linear diamines include hexamethylene diamine, heptamethylene diamine, octamethylene diamine, nonamethylene diamine, decamethylene diamine, undecamethylene diamine and dodecamethylene diamine, while suitable branched diamines include 2-methyl pentamethylene diamine, 3-methyl pentamethylene diamine, n-methyl-1,6-hexamethylene diamine wherein n is 2 or 3, n-methyl-1,7-heptamethylene diamine wherein n is 2, 3 or 4, n-methyl-1,8-octamethylene diamine wherein n is 2, 3 or 4, and n-methyl-1,12-dodecamethylene diamine wherein n is 2, 3, 4, 5 or 6. Mixtures of suitable diamines are also appropriate for use in preparing the acid oligomer.

The acid oligomer is prepared by combining a non-stoichiometric amount of the dicarboxylic acid with a suitable diamine such that the oligomer comprises excess dicarboxylic acid, in the form of both acid and alkylated ester. The oligomer may be formed by melting the dicarboxylic acid together with the diamine. In an alternative, the oligomer may be made by physically mixing the acid and diamine together. In another alternative, the oligomer may be made by admixture of the acid and diamine in an aqueous solution to form a salt. Regardless of the method used to prepare the oligomer, the reactants must be heated to a temperature that is greater than the melting point of the oligomer but less than the melting of the polyamide that the oligomer will be used to make. During heating, water is evolved from the reaction and is vented from the process. After a substantial portion of the water has been removed from the reaction mixture, the process of making the oligomer is complete.

The diamine component suitable for use in the present process may be selected from the group comprising an aliphatic diamine having from 6–12 carbon atoms, such as those set out above; and a diamine oligomer comprising a non-stoichiometric amount of the diamine and an aromatic dicarboxylic acid, at least a portion of which is in the form of an alkylated ester, in which the balance of the diamine oligomer comprises diamine. The diamine oligomer may be made using methods similar to those used to make the acid oligomer as set out above.

The acid and diamine oligomer components are relatively low melting components when in a monomeric form. For instance, the oligomer formed by mixing the dialkyl ester, dimethyl terephthalate, with decamethylene diamine has a melting point in the range of from about 110° C. to about 140° C. over the range of oligomer compositions formed by admixture of differing proportions of dialkyl ester and diamine. The melting point of the oligomer formed by mixing dimethyl terephthalate and a diamine that is a mixture (1:1) of hexarmethylene diamine and 2-methyl pentamethylene diamine ranges from about 25° C. to about 140° C. over the range of oligomer compositions that can be formed.

The process of the present invention includes admixture of the dicarboxylic acid component with the diamine component in the presence of water. The amount of each component added to the admixture is preferably a substantially stoichiometric amount, taking into account the total amount of each component in the reactant mixture, whether bound or free. In particular, the acid and diamine oligomers may contain both bound and free dicarboxylic acid and diamine and this should be taken into consideration. As one of skill in the art will appreciate, equimolar amounts of dicarboxylic acid and diamine will desirably yield a polyamide having the highest molecular weight. There may be some instances in which stoichiometric amounts of the components is not desirable. For example, to provide a polyamide with particular dyeability characteristics, it may be appropriate to use a small excess of dicarboxylic acid or diamine to produce a polyamide having either excess acid or diamine ends.

The amount of water required in the admixture is an amount sufficient to maintain the reaction in a stable condition. In this regard, the water should be at a level that eliminates, or at least minimizes, flashing or instantaneous evaporation of the reactants, as well as any other unstable conditions that may occur in the reactor. Preferably, the amount of water admixed with the components is at least 5% by weight of the reaction mixture, more preferably at least 10% by weight of the reaction mixture and most preferably at least 20% by weight of the reaction mixture.

The present process may optionally be conducted in the presence of a catalyst in order to accelerate reaction time. Suitable catalysts include phosphorous-containing compounds such as phosphinic acid and/or the sodium or potassium salts thereof, hypophosphorous acid, sodium hypophosphite, phosphoric acid and the like. In this regard, an appropriate amount of catalyst that could be added to the reaction mixture would be from about 0.05–2% by weight. A preferred amount of catalyst to be added to the mixture would be in the range of about 0.10–0.20% by weight.

Following admixture, the reactants are heated, generally in a reactor of the type typically used in the polymerization of polyamides, for example a stainless steel autoclave, in a controlled manner to a temperature at which the admixture forms a melt. The temperature will, of course, depend on the characteristics of the reactants used, but will preferably be a temperature at which thermal degradation and side branching formation problems are minimized as noted above. Volatile matter, and more particularly, nonessential volatile matter is discharged from the reactor while maintaining stable reaction conditions.

Once a substantial amount of the volatile matter has been vented, the admixture is further heated to a temperature above the melting point of the polyamide being formed so as to obtain a polyamide of a desired inherent viscosity, e.g. in the range of about 0.4–1.5 dL/g, and preferably in the range of about 0.6–1.0 dL/g. Again, the temperature will vary with the polyamide being formed, but will generally be in the range of 260°–320° C. The temperature is maintained for a sufficient period of time to drive polymerization of the components substantially to completion. As the reaction progresses, the temperature may have to be increased to avoid the separation of solids. This increase in temperature will vary but will generally be in the range of about 10–50° C., and preferably in the range of about 20–30° C. above the final melting temperature of the polyamide being formed.

The admixture may be heated under pressure, or heated at atmospheric pressure. The process is preferably conducted under pressure, preferably a pressure of between about 1 MPa and 2 MPa. more preferably a pressure of at least about 1.3 MPa (1300 kPa), and most preferably a pressure of at least about 1.7 MPa (1700 kPa). The pressure may be maintained constant throughout the process, or alternatively, once the elevated temperature of polymerization is attained, the pressure may be reduced so as to subject the polyamide to a "vacuum finishing" step in which the pressure in the reactor is reduced to less than atmospheric pressure, preferably by about 50–60 kPa, on application of a vacuum. This step serves to increase the molecular weight of the resulting polyamide. During pressure reduction, the pressure should be reduced in a manner that minimizes or avoids excessive foaming of the reaction mixture in the reactor. In this regard, anti-foam agents, which include polyethers such as Carbowax™, are preferably added to reduce the amount of foaming.

In a further aspect of the present invention, there is provided a partially aromatic polyamide formed from at least one aromatic dicarboxylic acid component and at least one aliphatic diamine component comprising a diamine having from 6–12 carbon atoms, wherein 20–100% by weight of the dicarboxylic acid of said acid component is in the form of an alkylated ester, said polyamide comprising from 1–100%, preferably at least about 15%, more preferably at least about 20% and most preferably at least about 50%, on a molar basis of N-alkylated amide or amine groups.

The polyamides of the present invention may be amorphous or partially crystalline polyamides having a beat of fusion as measured by differential scanning calorimetry (DSC) of greater than 17 J/g. The present polyamides preferably have an inherent viscosity in the range of about 0.4–1.5 dL/g, and particularly in the range of about 0.6–1.0 dL/g. The polymers generally have melting points greater than 260° C., preferably in the range of about 280–320° C. and most preferably in the range of about 290–310° C. Advantageously, the melting point of an alkylated polyamide prepared in accordance with the process of the present invention is generally at least 5° C. lower than the melting point of the corresponding non-alkylated polyamide.

The polyamides may be used in the manufacture of products using melt processing techniques, especially products intended for use at elevated temperatures or products in which retention of properties at elevated temperatures is required. For example, the polyamides may be formed into articles using injection moulding technology, for example, valves tanks, containers, washers and the like, parts for automotive end-uses, particularly those requiring resistance to temperatures of 260° C. or more, and articles where retention of mechanical properties under the influence of heat, moisture, hydrocarbons, alcohols including so-called gasohol, and the like are important articles such as, for example, retortable containers. Alternatively, the polymers may be spun into fibres, preferably having a tenacity of at least 1.5 g/denier and a modulus of at least 30 g/denier, for use as sewing or industrial thread where low shrinkage and elongation are important and/or retention of properties under the influence of moisture, hydrocarbons, alcohols and the like is important. The polyamides may also be formed into films or sheets having end-uses as, for example, electronic printed circuit boards, industrial packaging films, electrical insulation films, and substrates for coating. The barrier properties of the present polyamides to water and oxygen are further characteristics which may determine additional end-uses.

Specific embodiments of the present invention are illustrated in the following examples which are not to be construed as limiting.

EXAMPLE I

The Preparation of Polydecamethylene Terephthalamide and Polydodecamethylene Terephthalamide This example illustrates the synthesis of partially aromatic polyamides, namely polydecamethylene terephthalamide (10T) and polydodecamethylene terephthalamide (12T), using the known low temperature solution polymerization method described by N. Yamazaki et al. in J. Poly. Sci., 13, 1373–1380 (1975). This example provides the basis for comparing known methods with the method of the present invention.

A mixture of terephthalic acid (TPA) (8.31 g, 50 mmol), decamethylene diamine (DMD) (8.6 g, 50 mmol), and triphenyl phosphite (31.0 g, 100 mmol) was heated at 100° C. for 2 hours in a mixed solvent of N-methyl pyrrolidone (NMP) (500 ml) and pyridine (100 ml) containing calcium chloride (30 g, 21 wt %) and lithium chloride (10 g, 7 wt %), with stirring under nitrogen. After cooling, the reaction mixture was poured into methanol (4 L), and the precipitated polymer was separated by filtration, ground to a powder, washed well with methanol and dried under vacuum.

The polymer obtained was confirmed as poly (decamethylene terephthalamide), 10T, by NMR analysis. Its melting point was 310.6° C. and it had an inherent viscosity (IV) of 0.14 dL/g. Inherent viscosity was measured in m-cresol at 25° C. at a polymer concentration of 0.005 g/mL according to the procedure of ASTM D 2857-87. The polymer was off-white in colour.

Poly (dodecamethylene terephthalamide), 12T, was prepared by the same procedure, using dodecamethylene diamine (DDMD) instead of DMD. The resulting polymer was confirmed by NMR. It had a melting point of 296.6° C. and an IV of 0.20. It was also off-white in colour.

Both polymers (10T and 12T) exhibited polymorphism with meta-stable melt transitions at temperatures below the major melting points of 291.4° C. and 269.4° C. for 10T and 12T, respectively. No high melt fraction at temperatures above the melting point was observed after the 10T and the 12T had been annealed at 250° C. for 24 hours under nitrogen. After the thermal annealing, the meta-stable peak in the DSC scan of the 12T melt disappeared and a sharp melting point at 293.6° C. was observed. Annealing had a less profound effect on 10T. Both polymers show glass transitions in the temperature range of 100–120° C., consistent with the literature reported value for 12T.

EXAMPLE II

Preparation of Polyhdodecamethylene Terephthalamide in the Absence of Water

This example illustrates that use of conventional procedures to synthesize partially aromatic polyamides, such as 12T, from dimethyl ester of terephthalic acid and an aliphatic diamine, in the absence of water. The method fails to produce acceptable polymer in contrast to the method of the present invention.

DDMD (200 g; 1 mole) and DMT (194.2 g; 1 mole) were pre-mixed and blended thoroughly. The reactant mixture was charged to the 1L glass reactor and then was heated to 126° C. to form a homogeneous melt. The temperature was raised slowly, and at approximately 150° C., the reaction appeared to "take-off" i.e. flashes of the reactant occurred, partially plugging the cutter collector. A significant amount of the reactant was lost, particularly via the stirrer adapter head. Nonetheless, the reaction was taken to completion. The "polymer" formed in the reactor, and the evaporated solid materials deposited at the adapter head and the condenser, were isolated for analysis.

The polymer was solid, creamy yellowish in colour. The polymer had an IV of 0.45 and the DSC melt profile was very broad with non distinct peaks at 209.5 and 246.8° C. The polymer had about 357.31 carboxylic ends and about 0.45 amine ends, an extremely poor balance of carboxylic versus amine ends. Polymer yield was only 56% by weight. The evaporated material deposited at the adapter head was analyzed by IR spectrometer, and was found to be mostly DMT and DDMD, the starting monomers, with traces of oligomers.

The polymerization was repeated with careful monitoring of the reactor temperature. The phenomenon of reactant flash at temperatures between 150–200° C. was again observed. Polymer yield from the repeat run was 64%. Polymer IV was 0.32 and its melt profile was again broad with melting peaks at 220 and 259.3° C. The polymer had about 460 carboxylic ends and about 25 amine ends, again showing an extremely poor balance of ends.

Although the stoichiometric mixture of DMT and DDMD forms a stable comelt at 126° C., it is found that the reaction mixture becomes unstable at a temperature higher than 150° C. Serious flashes of the reactants occur which plague the reaction. Low molecular weight products are formed, with low melting points and a broad melting profile, at low yield. Under such reaction conditions, it is difficult to control the synthesis to give a balanced, useful polymer.

EXAMPLE III

Preparation of Polydodecamethylene Terephthalamide in the Presence of Water

In this example, the process of the present invention is used to prepare a partially aromatic polyamide (12T) from DMT and DDMD. This example is analogous to Example II with the exception of the use of water in this example.

DDMD (152 g; 0.76 mole) and DMT (146 g; 0.75 mole) were mixed with 100 ml of distilled water (25.1% by weight). The mixture was polymerized in a stirred glass reactor according to the procedure described in Example II. Complete dissolution of the slurry mixture occurred at about 82° C. At elevated temperature the reacting melt was stable, and the serious flashing of the reactants was absent. After the final heating stage (315°C.), the recovered polymer yield was 92.3%. The polymer had a sharp melting point at 285.2° C. NMR analysis confirmed the 12T structure of the polymer.

The 12T polymer was also synthesized in a 1 L autoclave with vacuum finish to achieve a higher molecular weight. DDMD (122 g; 0.61 mole) and DMT (117 g; 0.60 mole) were mixed with 100 mL of distilled water (30.4% by weight) and charged to the autoclave. The clave was purged free of oxygen, agitated at 100 rpm, and heated to 210° C. with a pressure building up to 1.72 MPa. While heating was continued to 240° C., steam was allowed to escape to maintain the pressure at 1.72 MPa. The pressure was then reduced by controlled steam release to atmospheric pressure over a 90 minute period, and the temperature of the reactor increased to 305° C. The temperature of the reactor was then increased to 310° C., under a reduced pressure of 40 kPa and for a further 10 minutes. The polymer melt was drained and quenched in a water bath. The polymer obtained was white and free of voids, having a sharp melting point of 276.8° C. It had an IV of 0.86. The polymer ends were well-balanced with the number of amine ends being about 106, while the number of carboxyl ends was about 143.

The addition of water significantly improves the process of Example II. The reaction was controllable. Monomer flashes were inhibited during the polymerization reaction and the resulting polymer products were produced in good yields (at least 90%) with well-defined melting points.

EXAMPLE IV

Preparation of Polydecamethylene Terephthalamide in the Absence of Water

This example illustrates the method of making 10T (polydecamethylene terephthalamide) from dimethyl ester of terephthalic acid (DMT) and decamethylene diamine (DMD) in the absence of water. The method is the same as that described in Example II.

In one trial, the reactants were DMT (0.6 moles), DMD (0.61 moles) and no water. The reaction profile was the same as in the Example II. The resulting product did not polymerize to a substantial degree.

The run was repeated under the same conditions, with the addition of 80 ppm of sodium hypophosphite as catalyst. During the run, the pressure was more difficult to control than in the method of Example II. The pressure was finally brought to 1.72 MPa by addition of nitrogen. The pressure let down cycle proceeded smoothly. The resultant polymer was golden, amorphous-like and brittle. It had a broad melting profile with a melting peak at 190° C. Polymer IV was 0.36. Polymer ends were unbalance with the number of amine ends at about 54, while the number of apparent carboxyl ends was about 391.

EXAMPLE V

Preparation of Polydecamethlene Terephthalamide in the Presence of Water

This example illustrates the method of the present invention in the synthesis of 10T from DMD and DMT. The method used was as described in Example III.

DMD (104 g; 0.61 mole) and DMT (117 g; 0.6 mole) were mixed with 100 ml of distilled water (31.2% by weight) and charged to the 1 L autoclave. The reaction profile was as follows: heat to 210° C., with pressure to 1.72 MPa; continue heating to 260° C., venting to maintain pressure at 1.72 MPa; pressure let down over 1 hour while heating to 320° C.; hold at 320° C. for 20 minutes; and vacuum finish at 320° C. at a pressure of 40 kPa for 10 minutes.

The polymer obtained had a sharp melting point at 290° C. NMR analysis confirmed the 10T structure. The IV of the polymer was 0.9. The number of amine ends was determined to be 46.34. Carboxyl end analysis could not be conducted, however, because the polymer was not soluble in benzyl alcohol. When repeated, the reaction was smooth and controllable, yielding a 10T polymer having a sharp melting point at 289° C.

Thus, the method of the present invention successfully utilizes water as one of the reactants, producing a polymer in high yield that is voidless, white in colour and has a sharp melting point that is slightly lower than the reference polymer described in Example 1. The synthesis reaction is controllable, and absent of reactant flashing when water is present.

EXAMPLE VI

Eutectic Depression of 12T Oligomer Melting Point in the Presence of Excess Dicarboxylic Acid Dialkyl Ester DMT (135 g; 0.696 mole), DDMD (75 g; 0.375 mole) and 75 mL of distilled water (26% by weight) were mixed in the open vessel polymerizer and cautiously heated according to the procedure described in Example II. The final heating temperature was 275° C. The melt during the reaction was stable and controllable. The product was cooled and then solidified. The recovered product yield was 92%. The product was tested by DSC, showing multiple melting peaks of which the highest was 233° C. NMR analysis confirmed the 12T oligomer structure, having a composition of DMT/DDMD mole ratio of 66.2/33.8 in the polymer chain, as compared to the starting monomer ratio of DMT/DDMD at 65/35.

The polymerization was also carried out for a reactant mixture of 75/25 mole ratio of DMT/DDMD monomers with 22.3% by weight of water. The product recovered was in good yield, and had multiple melting peaks with the highest at 207° C. NMR analysis confirmed the 12T oligmer structure, having a composition of DMT/DDMD mole ratio of exactly 75/25 in the polymer chain, identical to that in the monomer feed.

These examples confirmed eutectic depression of unbalanced oligomeric 12T melting points by excess dimethyl terephthalate. Balanced 12T, i.e. produced from a stoichiometric DMT/DDMD feed and having an approximately equal number of amine and carboxylic acid ends, had a sharp melting point at 285.2° C.

EXAMPLE VII

Eutectic Depression of 12T Oligomer Melting Point in the Presence of Excess Amine Using the procedure of Example VI above, DDMD (140 g; 0.7 mole), DMT (60 g; 0.308 mole) and 75 mL of distilled water (27.3% by wt.) were mixed, melted and heated until the distillation of the volatiles ceased at 300° C. The recovered product was in good yield, and exhibited a maximum melting peak at 240° C. by DSC. NMR analysis confirmed the 12T oligomer structure, having a composition of DMT/DDMD mole ratio of 25.1/74.9 in the polymer chain, as compared to the ratio of 30/70 in the monomer feed.

A 12T oligomer from a monomer ratio of DMT/DDMD (0.25 mole DMT/1.0 mole DDMD; 23.7% by weight water) was also prepared following the same procedure. The product had multiple melting peaks with a highest melting temperatures at 234° C. NMR confirmed the 12T oligomer structure with DMT/DDMD mole ratio in the polymer at 16.4/83.6.

These examples confirmed the eutectic depression of unbalanced oligomeric 12T melting points by excess dodecamethylene diamine. Balanced 12T from 50/50 DMT/DDMD has a much higher, single sharp melting point at 285.2° C.

EXAMPLE VIII

Eutectic Depression of 10T Oligomer Melting Point in the Presence of Excess Dicarboxylic Acid Dialkyl Ester Using the procedure of Example VI, DMT-rich 10T oligomers were prepared starting from a DMT-rich monomer feed for the polymerization. For example, 1 mole of DMT (194.3 g), 0.33 mole of DMD (57.3 g) and 75 mL of distilled water (23% by weight) (DMT/DMD-75/25) were mixed, and heated until volatiles ceased to evolve. The final reaction temperature was 250° C. The product recovered was in good yield, having multiple melting peaks with the highest melting temperature at 227° C. NMR analysis confirmed the 10T oligomer structure, having a composition of DMT/DMD of 72.2/27.8.

This example illustrates that eutectic depression of the DMT-rich 10T oligomer melting point by the excess DMT in the melt. Balanced 10T from a 50/50 DMT/DMD mixture has a sharp melting point at 290° C.

EXAMPLE IX

Eutectic Depression of 10T Oligomer Melting Point in the Presence of Excess Amine DMD-rich 10T oligomers were prepared starting from a DMD-rich monomer feed. DMT (64.1 g; 0.33 mole), DMD (172 g; 1 mole) and 75 mL of distilled water (24.1% by wt.) (DMT/DMD=25/75) were polymerized according to the procedure described in Example X. The product was obtained in good yield, having multiple melting peaks as determined by DSC, with the highest melting peak at 254° C. NMR analysis confirmed the 10T oligomer structure, having a DMT/DMD mole ratio of 26.2/73.8.

This example confirmed that eutectic depression of the DMD-rich 10T oligomer melting point by excess DMD in the melt.

EXAMPLE X

Preparation of 12T Polyamide Using a Dicarboxylic Acid Oligomer

This example illustrates the preparation of 12T polyamide by forming a DMT-rich oligomer first, as described in the previous examples, and then balancing the oligomer by adding the deficient quantity of diamine to form the final polymer.

At the outset, an unbalanced ratio of DMT to DDMD, i.e. DMT (146 g; 0.75 mole), DDMD (90 g; 0.45 mole), and 75 mL water (24.1% by wt.) were charged to the open polymerization vessel and heated according to the procedure outlined in Example VI. A molten reservoir of DDMD (0.31 mole 63 g), blanketed under nitrogen, was placed in an addition funnel connected to the reactor. Addition of this DDMD to the melt was made in stages, at 240° C. and 300° C., followed by increasing the temperature of the reaction, until a stoichiometric balance was achieved. The final reaction temperature was 290° C., at which the reaction melt was allowed to react for 1 hour, before cooling. The reaction melt was stable during the course, and resulted in good polymer yield (97%). The polymer recovered was white and voidless, having an IV of 0.22, and an amine end number of 115. It did not dissolve in hot benzyl alcohol for carboxyl end analysis. DSC scan showed a single sharp peak at 267.5° C. NMR analysis confirmed the 12T structure of the polymer, with a balanced molar ratio of DMT/DDMD of 49.5/50.5.

The polymerization was repeated in order to demonstrate reproducibility of the method. A similar 12T polymer was obtained in good yield, with a melting point at 264.2° C., and a melting curve profile almost identical to the 12T from previous run.

EXAMPLE XI

Preparation of 12T and 10T Using a Stoichiometric Mixture of Dicarboxylic Acid and Dialkylated Ester Thereof This example illustrates the synthesis of 12T from DDMD and a stoichiometric mixture of DMT and terephthalic acid (TPA) in the presence of water, according to the procedure described in Example III. The reactants charged to the autoclave were: DDMD, 0.501 mole (100.2 g), DMT, 0.25 mole (48.6 g), TPA, 0.25 mole (41.6 g), water, 100 mL (34.4% by weight). In this feed the DMT and TPA had a molar ratio of 1:1.

The reaction was controllable, and resulted in a good polymer (white and voidless) in good yield. The polymer had an IV of 0.96, and a sharp melting point at 289.1° C. NMR analysis confirmed the 12T polymer structure.

In another example 10T polymer was prepared starting from an 1:1 mixture of DMT/TPA. The reactants were: DMD, 0.64 mole (110 g), DMT, 0.31 mole (60 g), TPA, 0.31 mole (52 g), water, 100 mL (31.1% by weight). The reaction procedure was identical to that described above. The reaction was controllable and resulted in a polymer of good yield. Voids were observed in the solidified polymer, which had a sharp melting point at 318° C., with shoulder peaks at lower temperature. The polymer was insoluble for IV and ends analysis. NMR analysis confirmed the 10T polymer structure.

EXAMPLE XII

Alkylation of Partially Aromatic Polyamides

The alkylation of the amide functions in the partially aromatic polyamides was analyzed by the Nuclear Magnetic Resonance (NMR) method. The level of N-methylation in a number of polyamides, prepared as described in the foregoing examples, was quantified by integrating the peak area of the corresponding resonance signals. It was observed that N-alkylated polyamides derived from the dialkylated ester of a dicarboxylic acid had lower melting points than the corresponding polyamides derived from dicarboxylic acid by from about 5° to about 20° C. or more depending on the degree of N-alkylation in the polyamide. Specifically, all 10T or 12T N-alkylated polyamides derived from the dialkylated ester, dimethyl terephthalate (DMT), had melting points lower than the corresponding polyamides derived from the dicarboxylic acid, terephthalic acid. As shown below, the melting point depression correlates with the amount of N-methylation in the polyamide. For example, a 10% N-methylation of 10T depressed the melting point of the polyamide by 20° C., whereas in 12T, 2.3% N-methylation led to a lowering of 7.5° C. in the melting point. This effect is shown in Table I.

TABLE I

Melting Point and N-Methylation in 10T and 12T

| Polymer | Acid Monomer | Mole % N—CH3 | M.P.(oC) | Reference |
|---|---|---|---|---|
| 12T | TPA | 0 | 296.6 | Example I |
| 12T | TPA/DMT (50/50) | 2.3 | 289.1 | Example XI |
| 12T | DMT | 7.4 | 276.8 | Example III |
| 12T | DMT | 8.7 | 264.2 | Example X |
| 10T | TPA | 0 | 310.6 | Example I |
| 10T | DMT | 10.3 | 290.0 | Example V |

The NMR evidence indicates that N-alkylation of the polyamide occurs by reaction of the alkanol condensate, generated from the polymerization of the alkylated ester of the dicarboxylic acid and diamine, reacts with the nitrogen atom from the amide or the amine functionalities on the polyamide. The final polymer, thus, possesses alkyl branches on nitrogen atoms either along the polymer chain or at the chain end.

I claim:

1. A process for making a partially aromatic polyamide from at least one aromatic dicarboxylic acid component and at least one aliphatic diamine component comprising a diamine having from 6–12 carbon atoms, wherein 20–100% by weight of the dicarboxylic acid in said acid component is in the form of an alkylated ester, said process comprising the steps of:
    (a) admixing non-stoichiometric amounts of the acid component with the diamine component in the presence of water;
    (b) heating the admixture to a temperature at which it forms a melt while discharging therefrom volatile matter;
    (c) further heating the admixture to a temperature above the melting point of the partially aromatic polyamide to form a polyamide oligomer;
    (d) adding sufficient amounts of an aliphatic diamine having from 6–12 carbon atoms, or an aromatic dicarboxylic acid, at least a portion of which is in the form of an alkylated ester, so that the total amounts of the acid component and diamine component in the admixture of step (c) are approximately stoichiometric;
    (e) heating the admixture of step (d) to a temperature at which it forms a melt while discharging therefrom volatile matter; and
    (f) further heating the admixture to a temperature above the melting point of the stoichiometrically-balanced partially aromatic polyamide to form the polyamide.

2. A process as defined in claim 1, wherein in step (d), the addition of the diamine component or acid component to the polyamide oligomer during the polymerization process is carried out in multiple steps until the polyamide is stoichiometrically balanced.

3. A process as defined in claim 1, wherein said alkylated ester is a dialkyl ester.

4. A process as defined in claim 3, wherein at least about 20% of said dicarboxylic acid is in the form of a dialkyl ester.

5. A process as defined in claim 4, wherein at least about 40–75% of said dicarboxylic acid is in the form of a dialkyl ester.

6. A process as defined in claim 5, wherein substantially all of said dicarboxylic acid is in the form of a dialkyl ester.

7. A process as defined in claim 1, wherein the alkyl groups of said allkylated ester comprise from 1 to 4 carbon atoms.

8. A process as defined in claim 7, wherein the alkyl groups of said dialkyl ester comprise from 1 to 2 carbon atoms.

9. A process as defined in claim 1, wherein said dicarboxylic acid is selected from the group comprising terephthalic acid, isophthalic acid and mixtures thereof.

10. A process as defined in claim 1, wherein the diamine component is selected from the group consisting of an aliphatic diamine having from 6–12 carbon atoms; and a diamine oligomer comprising a non-stoichiometric amount of the diamine and an aromatic dicarboxylic acid, at least a portion of said acid being in the form of an alkylated ester, the balance of said oligomer comprising diamine.

11. A process as defined in claim 10, wherein said diamine is selected from the group consisting of linear and branched diamines.

12. A process as defined in claim 11, wherein said diamine is selected from the group consisting of hexamethylene diamine, heptamethylene diamine, octamethylene diamine, nonamethylene diamine, decamethylene diamine, undecamethylene diamine, dodecamethylene diamine, 2-methyl pentamethylene diamine, 3-methyl pentamethylene diamine, n-methyl-1,6-hexamethylene diamine wherein n is 2 or 3, n-methyl-1,7-heptamethylene diamine wherein n is 2, 3 or 4, nmethyl-1, 8-octamethylene diamine wherein n is 2, 3 or 4, and n-methyl-1,12dodecamethylene diamine wherein n is 2, 3, 4, 5 or 6, and mixtures thereof.

13. A process as defined in claim 2, wherein said acid oligomer is in the form of a salt.

14. A process as defined in claim 10, wherein said diamine oligomer is in the form of a salt.

15. A process as defined in claim 1, wherein the amount of water admixed with said acid and diamine components is at least about 5% by weight of the reaction mixture.

16. A process as defined in claim 15, wherein the amount of water admixed with said acid and diamine components is at least about 10% by weight of the reaction mixture.

17. A process as defined in claim 16, wherein the amount of water admixed with said acid and diamine components is at least about 20% by weight of the reaction mixture.

18. A process as defined in claim 1, wherein the admixture is heated to a temperature within a range of about 260–320° C. in step (c) and step (f).

19. A process as defined in claim 1, wherein the admixture is heated under pressure in the range of about 1 MPa–2 Mpa.

20. A partially aromatic polyamide formed from at least one aromatic dicarboxylic acid component and at least one aliphatic diamine component having from 6–12 carbon atoms, wherein 20–100% by weight of the dicarboxylic acid in said acid component is in the form of an alkylated ester, said polyamide comprising from 1–100% on a molar basis of N-alklyated amide groups.

21. A polyamide as defined in claim 20, having a melting point that is at least 5° C. lower than the melting point of the corresponding non-alkylated polyamide.

22. A polyamide as defined in claim 21, comprising at least about 15% on a molar basis of N-alklyated amide groups.

23. A polyamide as defined in claim 22, comprising at least about 20% on a molar basis of N-alklyated amide groups.

24. A polyamide as defined in claim 23, comprising at least about 50% on a molar basis of N-alklyated amide groups.

25. A polyamide as defined in claim 20, wherein the dicarboxylic acid component is selected from the group consisting of an aromatic dicarboxylic acid, at least a portion of which is in the form of an alkylated ester; and a dicarboxylic acid oligomer comprising a non-stoichiometric amount of an aromatic dicarboxylic acid, at least a portion of which is in the form of an alkylated ester, and an aliphatic diamine having from 6–12 carbon atoms in which the balance of said acid oligomer comprises the dicarboxylic acid.

26. A polyamide as defined in claim 20, wherein the diamine component is selected from the group consisting of an aliphatic diamine having from 6–12 carbon atoms; and a diamine oligomer comprising a non-stoichiometric amount of the diamine and an aromatic dicarboxylic acid, at least a portion of said acid being in the form of an alkylated ester, the balance of said oligomer comprising diamine.

* * * * *